United States Patent [19]

Kurata

[11] Patent Number: 4,704,920

[45] Date of Patent: Nov. 10, 1987

[54] POWER TRANSMISSION DEVICE OF FOUR WHEEL DRIVE VEHICLE

[75] Inventor: Noboru Kurata, Kamifukuoka, Japan

[73] Assignee: Honda Giken Kogyo Kabushiki Kaisha, Tokyo, Japan

[21] Appl. No.: 854,353

[22] Filed: Apr. 21, 1986

[30] Foreign Application Priority Data

Apr. 19, 1985 [JP] Japan .................................. 60-84284

[51] Int. Cl.⁴ ............................................. F16H 37/06
[52] U.S. Cl. ................................ 74/665 GC; 180/247; 180/249; 180/233
[58] Field of Search .......... 74/665 H, 665 T, 665 GC; 180/247, 233, 249

[56] References Cited

U.S. PATENT DOCUMENTS

| | | | |
|---|---|---|---|
| 2,595,494 | 5/1952 | Stratman | 180/247 X |
| 3,893,533 | 7/1975 | Tidwell | 180/233 X |
| 4,453,617 | 6/1984 | Wu | 180/247 |
| 4,493,387 | 1/1985 | Lake et al. | 180/249 X |
| 4,600,074 | 7/1986 | Watanabe et al. | 180/251 |

FOREIGN PATENT DOCUMENTS

| | | | |
|---|---|---|---|
| 1008588 | 5/1957 | Fed. Rep. of Germany | 74/665 GC |
| 3145117 | 5/1983 | Fed. Rep. of Germany | 180/249 |
| 1409035 | 12/1965 | France | 180/249 |
| 0154325 | 11/1981 | Japan | 180/267 |
| 0120504 | 7/1984 | Japan | 180/251 |

Primary Examiner—Leslie Braun
Assistant Examiner—Dirk Wright
Attorney, Agent, or Firm—Armstrong, Nikaido, Marmelstein & Kubovcik

[57] ABSTRACT

An output shaft is disposed in parallel relation to an engine crank shaft. The output shaft is formed with a gear portion. A first drive shaft is formed with another gear portion which is meshed with the gear portion formed on the output shaft, and disposed in the longitudinal direction intersecting the output shaft at right angle. The first shaft is adapted to transmit power to either ones of front and rear wheels. The output shaft and the first drive shaft are supported on a case. The case is detachably attached to an internal combustion engine. A second drive shaft is supported on an extension of the first drive shaft, and connected to the first drive shaft. The second drive shaft is adapted to transmit power to the remaining wheels of the front and the rear wheels. Due to the foregoing arrangement, both the front and rear wheels are simultaneously driven by one engine output shaft.

2 Claims, 5 Drawing Figures

POWER TRANSMISSION DEVICE OF FOUR WHEEL DRIVE VEHICLE

BACKGROUND OF THE INVENTION

This invention relates to a power transmission device of a four wheel drive vehicle in which the front and rear wheels are simultateously driven.

Conventionally, there is known a saddle-type four wheel drive vehicle called "buggy car" as shown in FIGS. 1 and 2. This saddle-type four wheel drive vehicle is disclosed in Japanese Laid-open Patent Publication No. 59(1984)-120504.

In such a four wheel drive vehicle as discussed above, a drive sprocket 02 for driving rear wheels rigidly mounted on a rear wheel output shaft 01 and a drive sprocket 04 for driving front wheels rigidly mounted on a front wheel output shaft 03 are disposed opposite with respect to each other. And, the rear wheel output shaft 01 is connected to the front wheel output shaft 03 through a chain 06 within a crank case.

The problems involved in the aforementioned conventional vehicle are that since the front wheel output shaft 03 is disposed within the crank case 05 and the chain 06 for connecting the rear wheel output shaft 01 and the front wheel output shaft 03 are disposed within the crank case 05, an engine for the use of a conventional motorcycle cannot be commonly used, and a new engine is required. Thus, there cannot be expected a cost down as a result of mass production, and a large size of the engine is unavoidable.

The present invention was accomplished in view of the above problems.

SUMMARY OF THE INVENTION

It is therefore an object of the present invention to provide a power transmission device of a four wheel drive vehicle, wherein front and rear wheels are simultaneously driven by one engine output shaft, so that an engine for the use of a conventional motorcycle can be commonly used.

Another object of the invention is to provide a power transmission device of a four wheel drive vehicle, wherein a first drive shaft is connected to a second drive shaft on the co-axis through a coupling, so that no pivotally supporting means such as a bearing is required at one end of the second drive shaft.

A further object of the invention is to provide a power transmission device of a four wheel drive vehicle, wherein a first drive shaft is disconnectably connected to a second drive shaft through a coupling, so that the power transmission device can be easily assembled and disassembled to enhance maintenance.

In order to accomplish the above objects, there is essentially provided a power transmission device of a four wheel drive vehicle comprising an output shaft disposed in parallel relation to an engine crank shaft, a first drive shaft including a gear portion meshed with a gear portion formed on the output shaft, disposed in the longitudinal direction intersecting the output shaft at right angle and adapted to transmit power to either ones of front and rear wheels, a case supporting the output shaft and the first drive shaft, and detachably attached to an internal combustion engine, and a second drive shaft supported on an extension of the first drive shaft, connected to the first drive shaft, and adapted to transmit power to the remaining wheels of the front and the rear wheels.

The feature of the present invention is that both the front and rear wheels are simultaneously driven by one engine output shaft.

The above and other objects and features of the present invention will become more apparent to those skilled in the art upon reading the following detailed description of the embodiment with reference to the accompanying drawings in which:

DETAILED DESCRIPTION OF THE EMBODIMENTS

Figure 1:
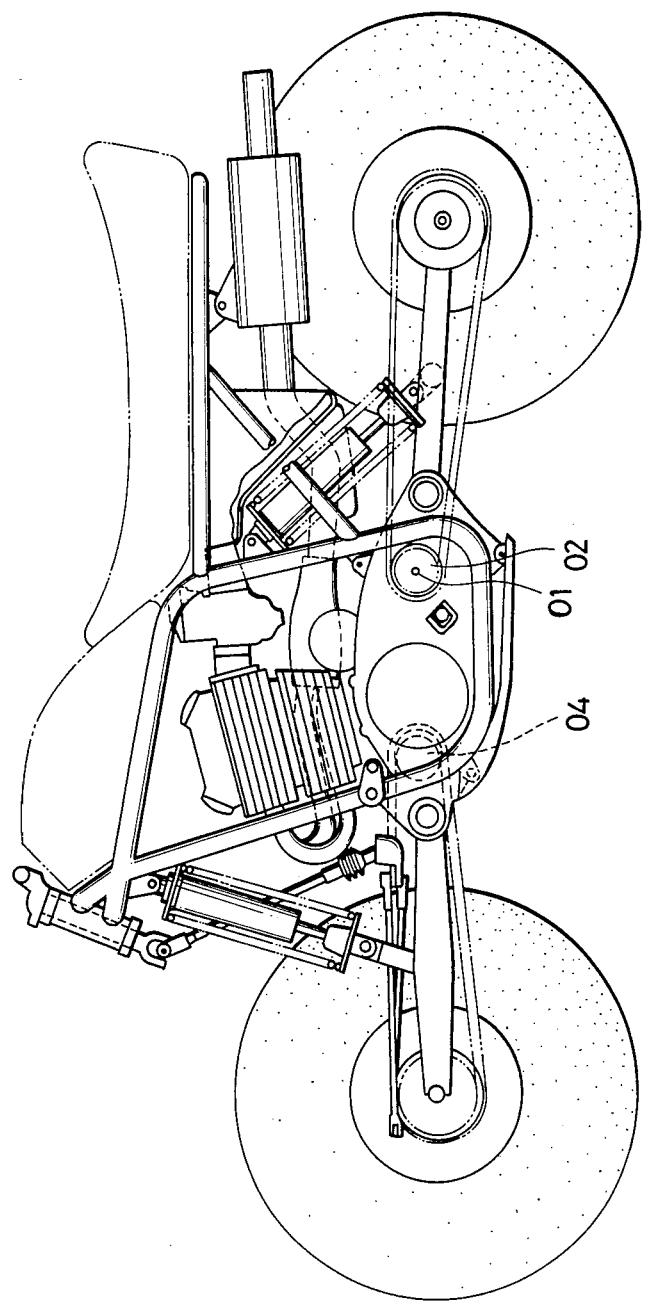
FIG. 1 is a side view of a four wheel drive vehicle equipped with a conventional power transmission device of a four wheel vehicle.
Figure 2:
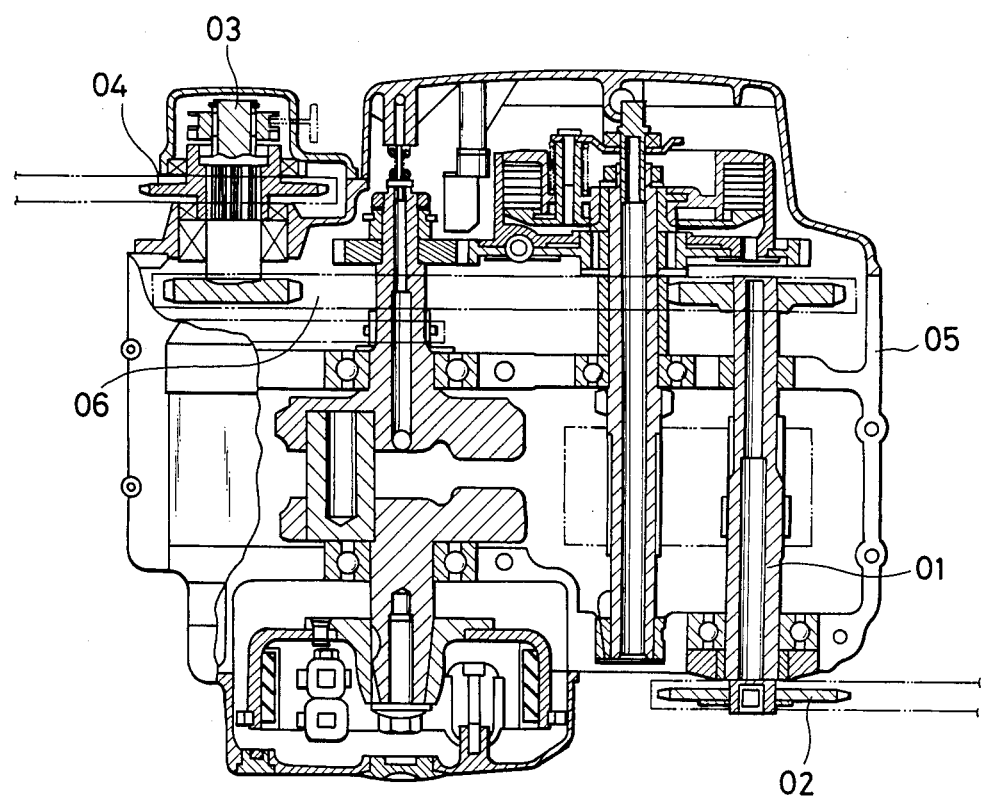
FIG. 2 is a vertical plan view showing an important part thereof.

One embodiment of the present invention will be described hereunder with reference to FIGS. 3 through 5.

Reference numeral 1 denotes a saddle-type four wheel drive vehicle generally called "buggy car". An engine 3 designed for the use of a motorcycle is mounted on the center of a vehicle body frame 2 of the four wheel drive vehicle 1.

Front wheels 4 and rear wheels 5 are pivotally attached to one ends of a front fork assembly 6 and a rear fork assembly 7 respectively. Ends of basic body of the front fork assembly 6 and rear fork assembly 7 are vertically swingably supported on the vehicle body frame 2 through a swing arm pivot 42 and a swing arm pivot 43. The one ends of the front fork assembly 6 and rear fork assembly 7 are supported by the vehicle body frame 2 through a front wheel suspension apparatus 8 and a rear wheel suspension apparatus 9 respectively.

A crank shaft 11 rotatably pivotally supported by a crank case 10 of the engine 3 is mounted a centrifugal clutch 12 which is designed as such that the same is coupled when it exceeds a predetermined speed of rotation. The centrifugal clutch 12 is attached with a crank gear 13.

On a main shaft 14 adjacent and parallel to the crank shaft 11 rotatably pivotally supported by the crank case 10 is mounted a multiple disc clutch 15. An input gear 16 of the multiple disc clutch 15 is meshed with the crank gear 13. When the crank shaft 11 exceeds the predetermined speed and the multiple clutch 15 is coupled by a clutch operation mechanism 17, rotation of the crank shaft 11 is transmitted to the main shaft 14.

A counter shaft 19 adjacent and parallel to the main shaft 14 is rotatably pivotally supported by the crank case 10. A main shaft gear group 18 mounted to the main shaft 14 and a counter shaft gear group 20 mounted to the counter shaft 19 are selectively meshed with a gear shifting mechanism (not shown). As a result, the counter shaft 19 is driven to rotate at a required speed ratio.

An output shaft 23 is rotatably mounted to the crank case 10 and rotatably pivotally supported by an output shaft case 22 through a bearing 26, so that a gear 24 of the output shaft 23 is meshed with a counter gear 21 at the output side of the counter shaft 19. The output shaft case 22 is provided with a bearing 27 for pivotally supporting a first drive shaft 29 as will be described.

A first drive shaft case 28 pivotally supporting a first drive shaft 29 through a bearing 31 is rigidly attached to the output shaft case 22 by a bolt 34, so that a bevel gear 30 of the first drive shaft 29 is meshed with an output bevel gear 25 of the output shaft 23.

A second drive shaft pivotally supporting portion 35 is disposed at the vehicle body frame 2 on an extension of the first drive shaft 29. A front end of the second drive shaft 36 is rotatably pivotally supported by the second drive shaft pivotally supporting portion 35 through a bearing 39. A front end portion 33 of the first drive shaft 29 and a rear end portion 37 of the second drive shaft 36 are rigidly connected to a coupling 40 by a screw 41.

A rear end spline 32 of the first drive shaft 29 and a front end spline 38 of the second drive shaft 36 are connected with a rear wheel drive shaft 46 and a front wheel drive shaft 47 through universal couplings 44 and 45. The first drive shaft case 28 and the second drive shaft pivotally supporting portion 35 are arranged as such that the first drive shaft 29 and the second drive shaft 36 are located on the line connecting a swing arm pivot 42 and a swing arm pivot 43 pivotally supporting the front fork assembly 6 and the rear fork assembly 7 respectively. The universal couplings 44 and 45 are arranged as such that the couplings 44 and 45 are respectively located on a line connecting a pair of right and left swing arm pivots 43 and a line connecting a pair of right and left swing arm pivots 42.

Figure 3:
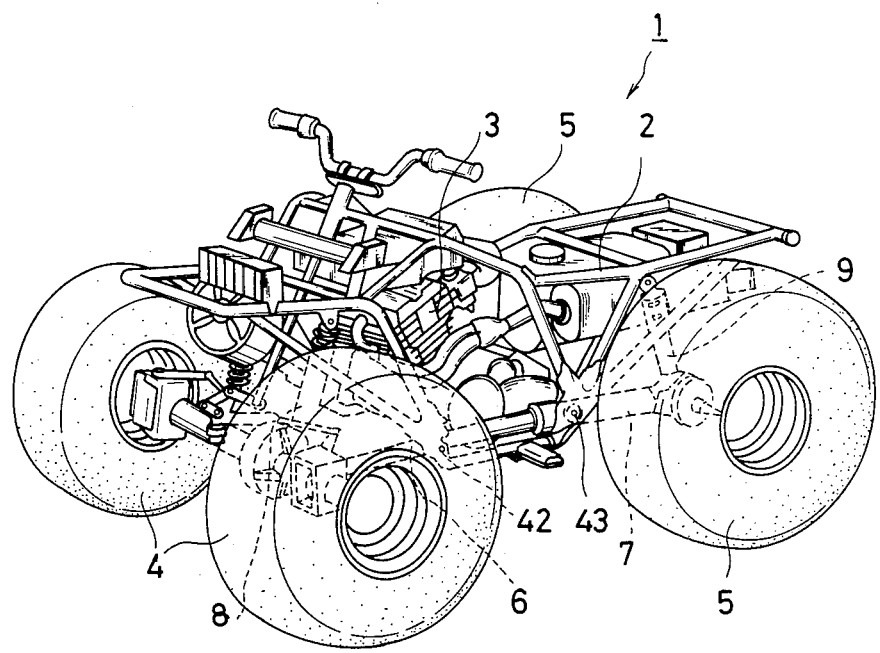
FIG. 3 is a perspective view showing a power transmission device of a four wheel drive vehicle according to one embodiment of the present invention.
Figure 4:
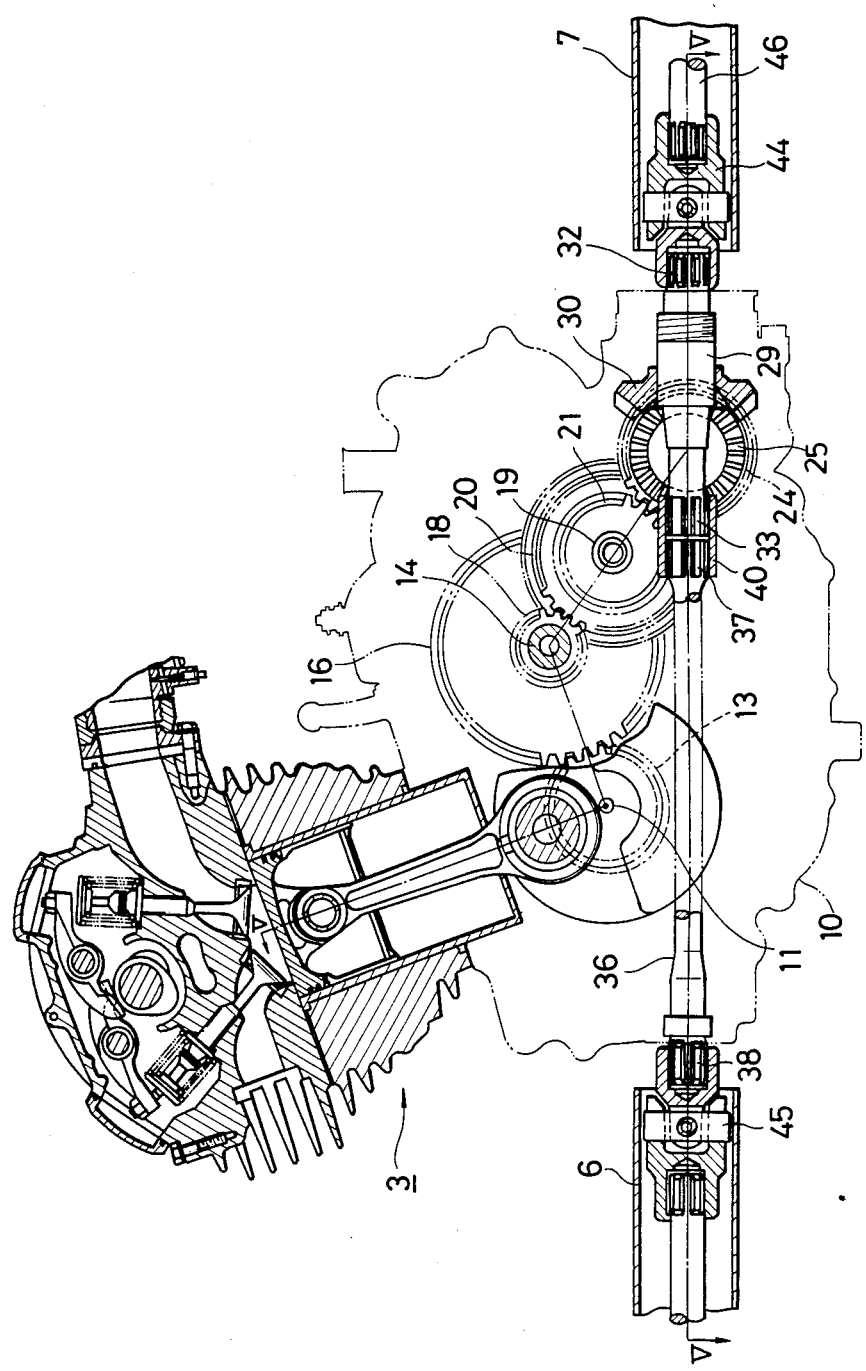
FIG. 4 is a side view, partly cut out, thereof.
Figure 5:
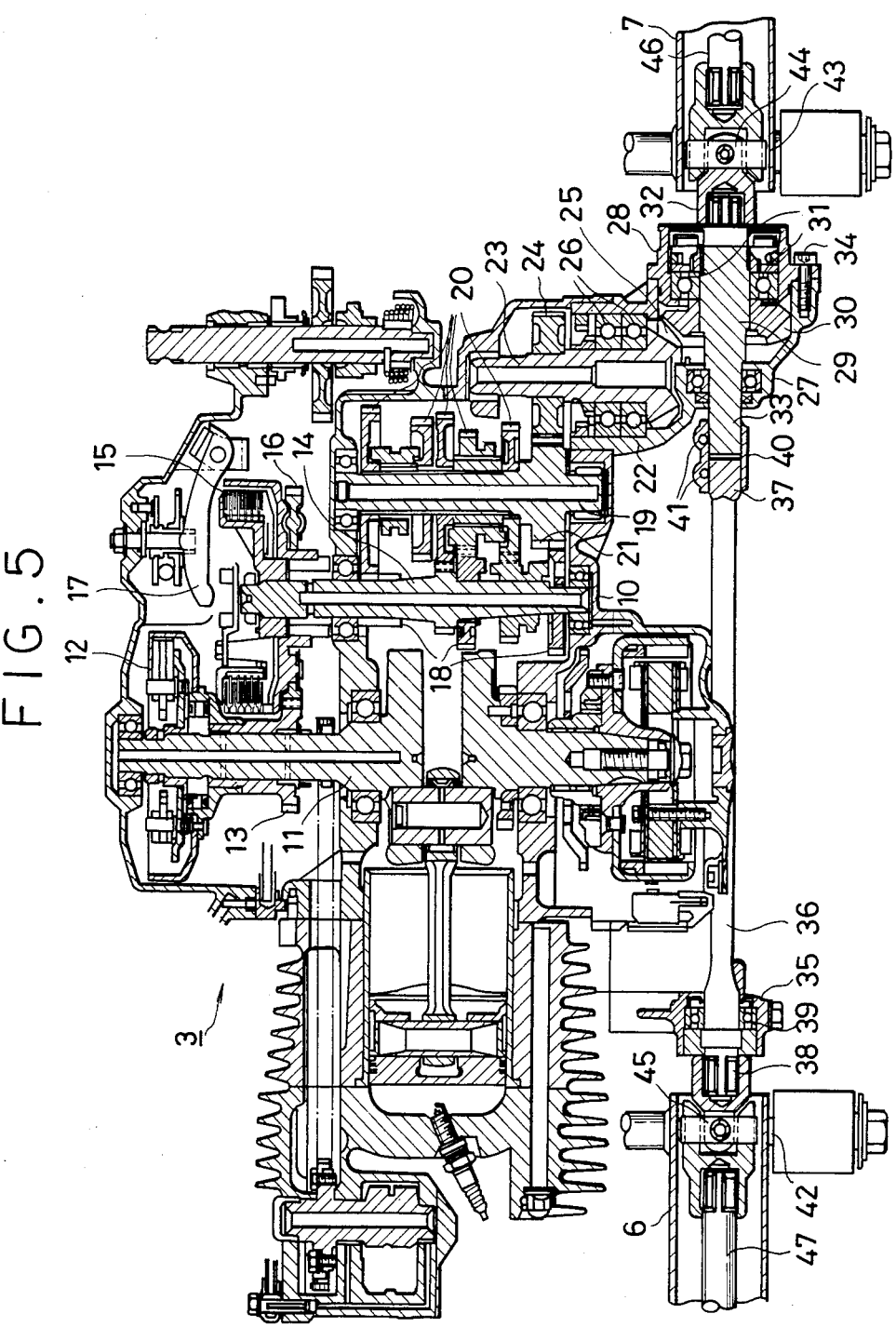
FIG. 5 is a vertically sectional side view taken on line V—V of FIG. 4.

With the aforementioned constitution of the embodiment shown in FIGS. 3 through 5, when the engine 3 starts driving, it exceeds the speed of rotation for coupling the centrifugal clutch 12, the multiple disc clutch 15 is set in a coupling state, and the main shaft gear group 18 and the counter shaft gear group 20 are properly meshed at a predetermined speed ratio, Then, torque of the crank shaft 11 is transmitted to the output bevel gear 25 through centrifugal clutch 12, crank gear 13, input gear 16, multiple disc clutch 15, main shaft 14, main shaft gear group 18, counter shaft gear group 20, counter shaft 19, counter gear 21, gear 24, and output shaft 23. As a result, the bevel gear 30 meshed with the output gear 25 is driven to rotate. The torque is transmitted to the rear wheels 5 by the first drive shaft 29 rigidly formed with the bevel gear 30 through the universal coupling 44 and the rear wheel drive shaft 46, and also to the front wheels 4 through the universal coupling 45 and the front wheel drive shaft 47. As a result, the four wheel drive vehicle 1 is driven by the four wheels for running.

The first drive shaft 29 and the second drive shaft 36 are disposed on the longitudinal line connecting the swing arm pivot 43 and the swing arm pivot 42. Disposed on the transversing line connecting the right and left swing arm pivots 43 and swing arm pivots 42 respectively are universal couplings 45 and 44. Due to the foregoing arrangement, when the front fork assembly 6 and the rear fork assembly 7 are vertically swung about the swing arm pivot 42 and the swing arm pivot 43, the length of the vehicle wheel drive shaft is almost unchanged.

Further, the entire construction of the engine 3, which is designed for the use of a motorcycle originally, and the configuration of the crank case 10 are not required to be modified. What is simply required is to commonly use the motorcycle engine 3, to replace an output shaft case (not shown) of the motorcycle pivotally supporting the output shaft 23 with the output shaft case 22, and to have the output bevel gear 30 of the output shaft 23 meshed with the bevel gear 30 of the first drive shaft 29. Accordingly, the engine 3 can be used both for a motorcycle and a four wheel vehicle, hence can be mass-produced to obtain a cost-down. In addition, since the configuration of the engine 3 can be used as it is, the power system can be made compact.

Furthermore, the rear end portion 37 of the second drive shaft 36 is located at the front end portion 33 of the first drive shaft 29 on the co-axial line through the coupling 40 and rigidly connected by the screw 41 to the shaft 29. Due to the foregoing, the rear end portion 37 of the second drive shaft 36 is not required to be supported by the vehicle body frame 2 through the bearing. Thus, the component parts can be reduced in number and made light in weight. In addition, the first drive shaft 29 and the second drive shaft 36 can be disconnected merely by unfastening the screw 41 and displacing the coupling 40 in the axial direction. Thus, maintenance can be facilitated.

As apparent from the foregoing description, the present invention is constituted as such that the front and the rear vehicle wheels can be simultaneously driven by one engine output shaft. Accordingly, the engine is not required to be made for the exclusive use of a four wheel drive vehicle. Instead, it can be made for a wide use. Thus, there can be obtained at cost-down due to mass production. In addition, it can be made small in size.

Furthermore, according to the present invention, the first drive shaft and the second drive shaft are connected on the co-axial line through the coupling. Accordingly, it is not required to provide a pivotally supporting mechanism such as a bearing to one end of the second drive shaft closer to the first drive shaft for supporting thereof. Thus, the component parts can be reduced in number, thus here again enabling to obtain a light weight and a cost reduction.

Furthermore, according to the present invention, the first drive shaft and the second drive shaft can be disconnectably connected through the coupling. Accordingly, the power transmission apparatus can be easily assembled and disassembled. Thus, maintenance can be facilitated.

While only one embodiment of the present invention has been shown in detail, it will be understood that the same is for illustration purpose only and is not to be taken as a definition of the present invention. It will be apparent that many modifications and alternations may be made within the spirit of the present invention.

What is claimed is:

1. A power transmission device of a four wheel drive vehicle comprising:
   an engine having a case and a crank shaft in said case disposed perpendicular to the longitudinal direction of said vehicle;
   an output shaft disposed in parallel relation to said engine crank shaft and projecting from a side of said engine case;
   a first drive shaft including a gear portion meshed with a gear portion formed on said output shaft, disposed in the longitudinal direction of said vehicle and intersecting said output shaft at right angle for transmitting power to either ones of the front and the rear wheels;

a case supporting said output shaft and said first drive shaft, and detachably attached to an internal combustion engine; and a second drive shaft outside of said case supporting said output shaft and said first drive shaft, said second drive shaft being supported on an extension of said first drive shaft and connected to said first drive shaft for transmitting power to the remaining wheels of the front and the rear wheels.

2. A power transmission device of a four wheel drive vehicle comprising:

an engine having a case and a crank shaft in said case disposed perpendicular to the longitudinal direction of said vehicle;

an output shaft disposed in parallel relation to said engine crank shaft and projecting from a side of said engine case;

a first drive shaft including a gear portion meshed with a gear portion formed on said output shaft, disposed in the longitudinal direction of said vehicle and intersecting said output shaft at right angle for transmitting power to either ones of the front and the rear wheels;

a case supporting said output shaft and said first drive shaft, and detachably attached to an internal combustion engine; and a second drive shaft outside of said case supporting said output shaft and said first drive shaft, said second drive shaft being supported on an extension of said first drive shaft and connected to said first drive shaft through a coupling for transmitting power to the remaining wheels of the front and the rear wheels, said coupling being detachably attached to said first drive shaft and said second drive shaft for rigidly connect both said drive shafts.

* * * * *